United States Patent
Lo et al.

(10) Patent No.: US 11,358,673 B2
(45) Date of Patent: Jun. 14, 2022

(54) TUBE FOR A BICYCLE

(71) Applicant: Puretek Manufacturing Co., Ltd., Taichung (TW)

(72) Inventors: Kuang-Yen Lo, Taichung (TW); Jonas Mueller, Muttenz (CH)

(73) Assignee: Puretek Manufacturing Co., Ltd., Taichung (TW)

( * ) Notice: Subject to any disclaimer, the term of this patent is extended or adjusted under 35 U.S.C. 154(b) by 358 days.

(21) Appl. No.: 16/562,477

(22) Filed: Sep. 6, 2019

(65) Prior Publication Data
US 2020/0108886 A1 Apr. 9, 2020

(30) Foreign Application Priority Data

Oct. 8, 2018 (TW) ................. 107135363

(51) Int. Cl.
*B62K 19/06* (2006.01)
*B62K 19/30* (2006.01)
*B62K 11/14* (2006.01)

(52) U.S. Cl.
CPC .............. *B62K 19/06* (2013.01); *B62K 19/30* (2013.01); *B62K 11/14* (2013.01)

(58) Field of Classification Search
CPC ......... B62K 19/06; B62K 19/30; B62K 11/14
See application file for complete search history.

(56) References Cited

U.S. PATENT DOCUMENTS

| | | | |
|---|---|---|---|
| 3,209,575 A | 10/1965 | Woodward, Jr. et al. | |
| 4,582,259 A | 4/1986 | Hoover | |
| 8,453,781 B2 | 6/2013 | Kawai | |
| 8,678,416 B2 † | 3/2014 | Chubbuck | |
| 8,894,085 B2 * | 11/2014 | Yu | B62K 19/16 280/283 |
| 2014/0252744 A1 * | 9/2014 | D'Aluisio | B62K 19/06 280/279 |
| 2016/0194048 A1 * | 7/2016 | Park | B62K 3/12 280/202 |
| 2020/0108886 A1 * | 4/2020 | Lo | B62K 19/30 |
| 2020/0346708 A1 * | 11/2020 | Moechnig | B62J 9/10 |

FOREIGN PATENT DOCUMENTS

CN 102530152 B 10/2014

OTHER PUBLICATIONS

EP3636522 European search opinion.†

* cited by examiner
† cited by third party

*Primary Examiner* — Minnah L Seoh
*Assistant Examiner* — Marlon A Arce
(74) *Attorney, Agent, or Firm* — Alan D. Kamrath; Karin L. Williams; Mayer & Williams PC

(57) ABSTRACT

A tube for a bicycle has a body, an indented portion, and a machined hole. The indented portion is radially recessed in the body and has an outer bottom surface, an outer annular surface, and a first round corner being a curved surface smoothly connecting an outer tube surface of the body and the outer annular surface. The machined hole is formed through the outer bottom surface of the indented portion and has an area being less than an area of the outer bottom surface. The indented portion formed around the machined hole distributes stress to prevent cracking occurring from an edge of the machined hole. The structural strength of the tube is increased under a same total weight.

19 Claims, 7 Drawing Sheets

TUBE FOR A BICYCLE

BACKGROUND OF THE INVENTION

1. Field of the Invention

The present invention relates to a tube with a machined hole, and more particularly to a tube for a bicycle which has an indented portion formed around the machined hole to prevent failure caused by cracks starting from an edge of the machined hole.

2. Description of Related Art

With reference to FIG. 7, when a conventional tube 90 of a bicycle having a machined hole 91 is under external forces such as bending and/or torsional load, stress will concentrate on regions 92 around an edge of the machined hole 91. The tube 90 will be easily cracked from the edge of the machined hole 91.

To resolve the crack issue, a thickness of the edge around the machined hole 91 of the conventional tube 90 is increased. For example, a reinforcement block is welded around the machined hole 91 to increase the thickness of the edge around the machined hole 91. The structural strength of the edge of the machined hole 91 is increased to prevent cracking starting from the edge around the machined hole 91.

However, preventing the cracks by increasing the thickness of the edge around the machined hole 91 will also cause a disadvantage of increasing a total weight of the tube 90.

To overcome the shortcomings, the present invention tends to provide a tube for a bicycle to mitigate or obviate the aforementioned problems.

SUMMARY OF THE INVENTION

The main objective of the invention is to provide a tube for a bicycle with a machined hole, which has an indented portion formed around the machined hole for distributing stress and preventing stress from getting concentrated around the edge of the machined hole to prevent cracks of the tube. The structural strength of the tube can be increased without increasing a total weight of the tube.

A tube for a bicycle comprises a body, an indented portion, and a machined hole. The body is made of a material selected from one of a metallic material and a composition material. The body has an outer tube surface, an inner tube surface, an inner hole, and a thickness. The indented portion is radially recessed in the body from the outer tube surface to the inner tube surface of the body and has a thickness being equal to the tube thickness of the body, an outer bottom surface, an outer annular surface formed around the outer bottom surface to form an opening gradually larger outward from the outer bottom surface of the indented portion, and a first round corner being a curved surface smoothly connecting the outer tube surface of the body and the outer annular surface of the indented portion. An angle formed between a tangent line, which is tangent to the outer annular surface, and a tangent plane, which is tangent to the outer tube surface of the body, is less than 90 degrees and greater than or equal to 15 degrees. The machined hole is formed through the outer bottom surface of the indented portion and communicates with the inner hole of the body and has an area being smaller than an area of the outer bottom surface of the indented portion.

Other objects, advantages and novel features of the invention will become more apparent from the following detailed description when taken in conjunction with the accompanying drawings.

DETAILED DESCRIPTION OF PREFERRED EMBODIMENT

Figure 1:
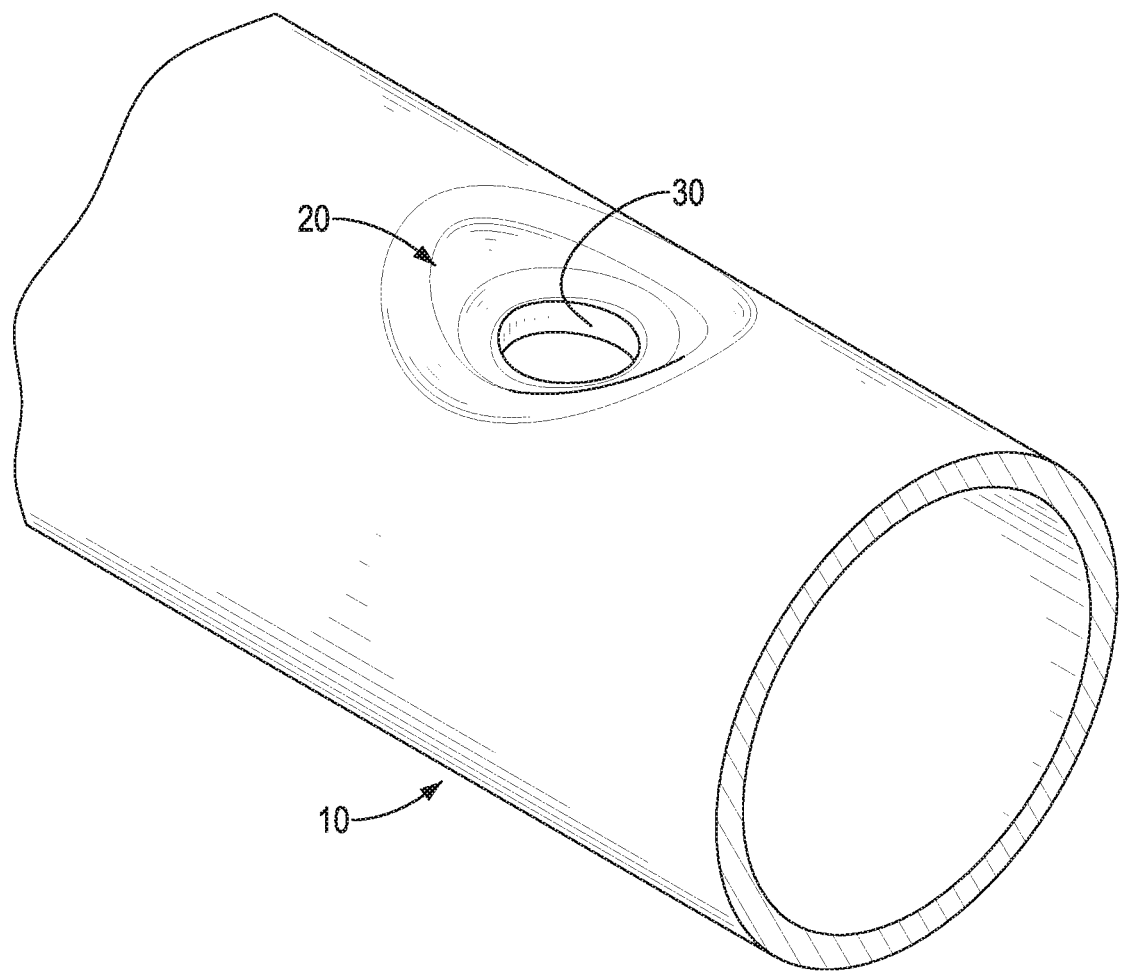
FIG. 1 is a perspective view in partial section of an embodiment of a tube for a bicycle with a machined hole in accordance with the present invention.
Figure 2:
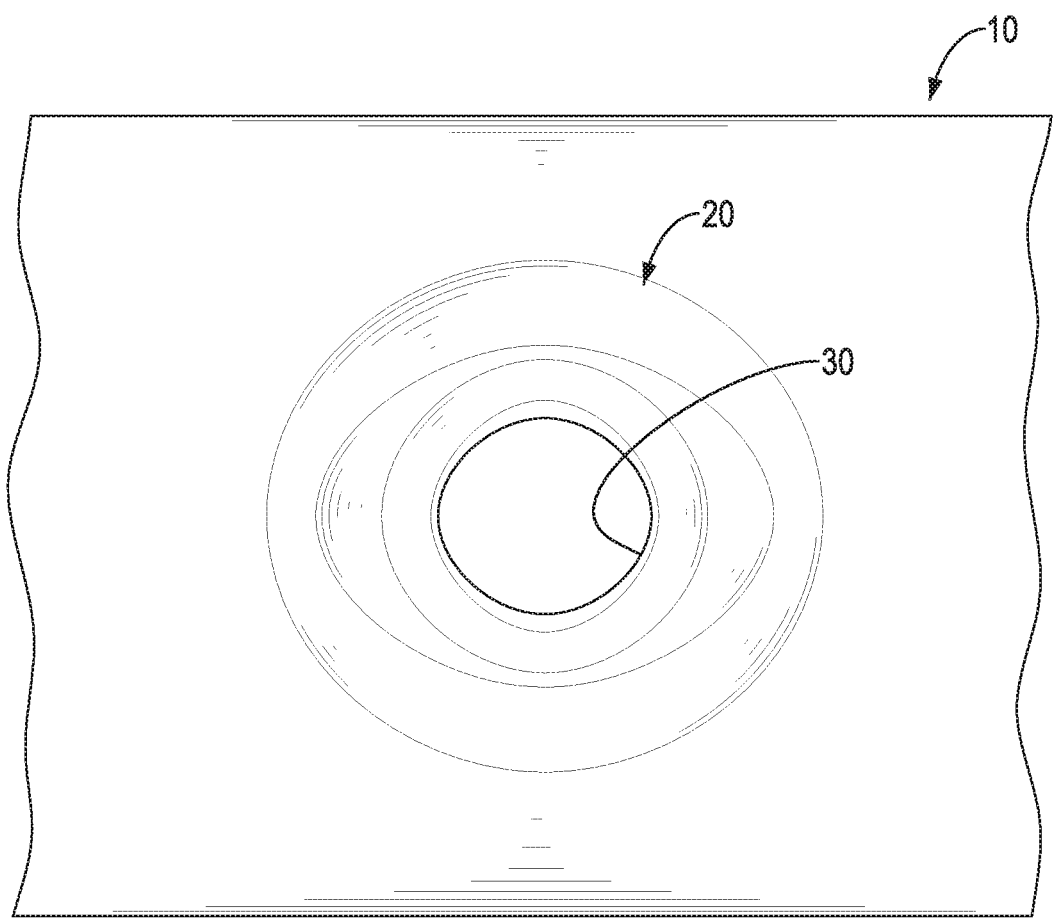
FIG. 2 is an enlarged top view of the tube in FIG. 1.
Figure 3:
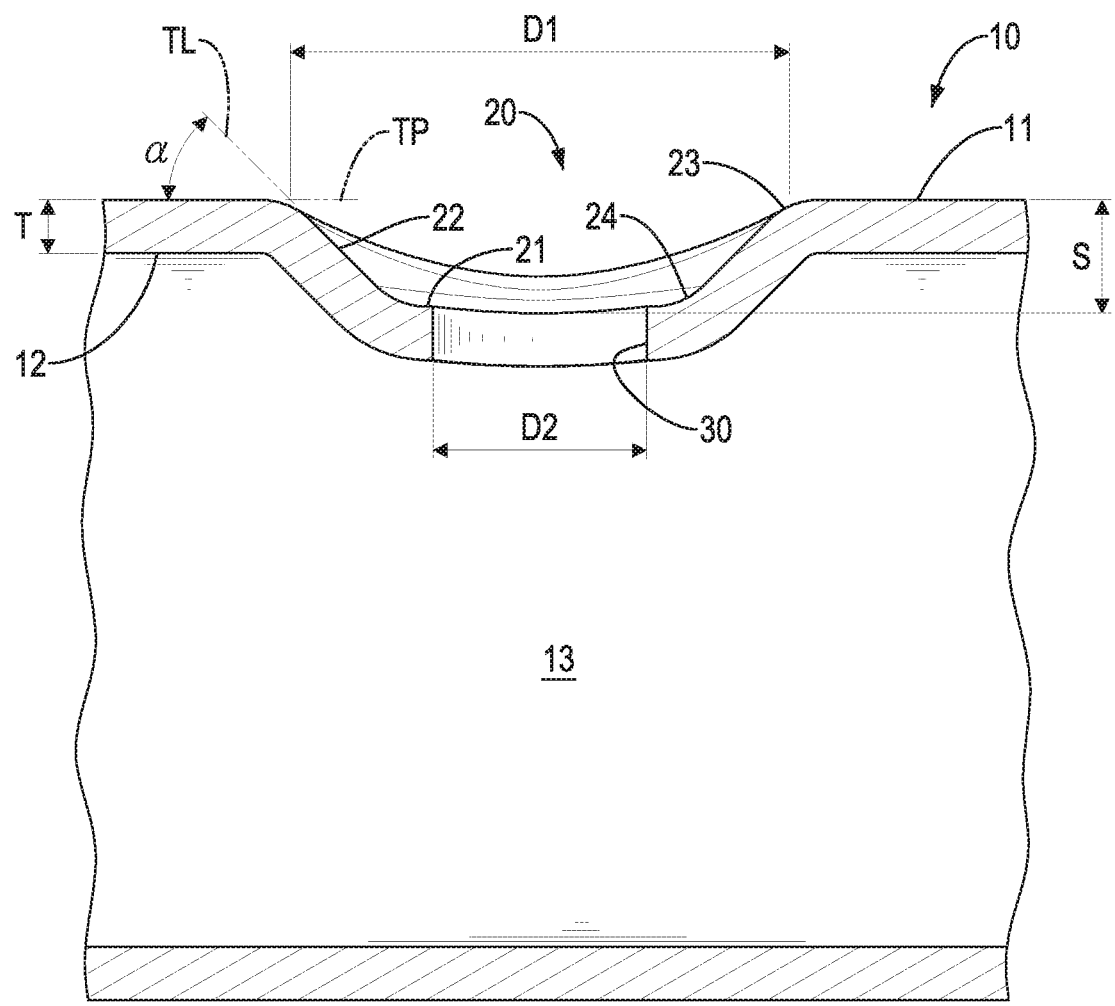
FIG. 3 is an enlarged cross sectional side view of the tube in FIG. 1.
Figure 4:
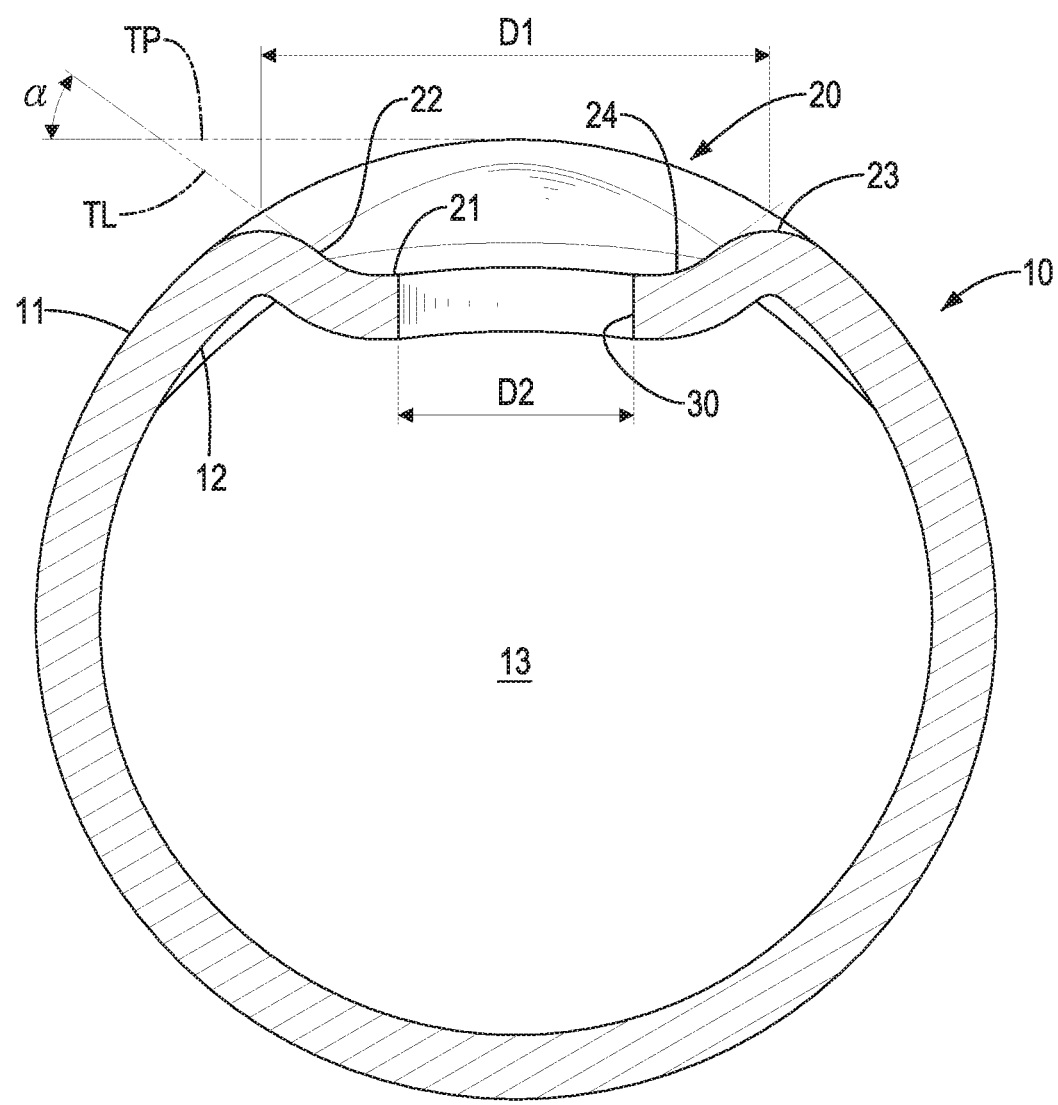
FIG. 4 is a cross sectional end view of the tube in FIG. 1.

With reference to FIGS. 1 to 4, a tube for a bicycle in accordance with the present invention has a body 10, an indented portion 20, and a machined hole 30. The body 10 may be made of metal or a composition material, e.g., aluminum alloy tube, stainless steel tube, carbon fiber tube, and so on. The body 10 may be a cylindrical tube, an oval tube, a rectangular tube, a bent tube, and so on. The body 10 has an outer tube surface 11, an inner tube surface 12, an inner hole 13 longitudinally formed through the body 10, and a tube thickness T defined between the outer tube surface 11 and the inner tube surface 12.

The indented portion 20 is radially recessed in the body 10 from the outer tube surface 11 toward the inner tube surface 12. A thickness of the indented portion 20 is equal to the tube thickness T. The indented portion 20 has an outer bottom surface 21, an outer annular surface 22, and a first round corner 23. The outer annular surface 22 is formed around the outer bottom surface 21 to form an opening gradually larger outward from the outer bottom surface 21. The outer annular surface 22 is formed as a slope. The first round corner 23 is formed between the outer tube surface 11 of the body 10 and the outer annular surface 22 and is a curved surface smoothly connecting the outer tube surface 11 and the outer annular surface 22. The indented portion 20 has a recessed depth S in the body 10, which is a vertical distance from a tangent plane TP being perpendicular to a recessed direction of the indented portion 20 and being tangent to the outer tube surface 11 of the body 10 to the outer bottom surface 21, is from 1 time to 3 times of the tube thickness T. The first round corner 23 is rounded with a radius of a maximum of 5 times of the tube thickness T and a minimum of 1 time of the tube thickness T, or the first round corner 23 is a continuous curvature having a dimension equivalent to a radius of a maximum of 5 times of the tube thickness T and a minimum of 1 time of the tube thickness T. A second round corner 24 is formed between the outer annular surface 22 and the outer bottom surface 21 and is a curved surface smoothly connecting the outer annular surface 22 and the outer bottom surface 21. The second round corner 24 is rounded with a radius of a maximum of 5 times of the tube thickness T, or the second round corner 24 is a continuous curvature having a dimension equivalent to a radius of a maximum of 5 times of the tube thickness T. An angle α is formed between a tangent line TL, which is tangent to the outer annular surface 22, and the tangent plane TP, which is tangent to the outer tube surface 11 of the body 10 and is perpendicular to a recessed direction of the indented portion 20. The angle α is less than 90 degrees and greater than or equal to 15 degrees. Preferably, the angle α is less than or equal to 75 degrees and greater than or equal to 30 degrees.

The machined hole 30 is formed through the outer bottom surface 21 and communicates with the inner hole 13 of the body 10, and has an area smaller than an area of the outer bottom surface 21. Preferably, a distance D1 between two radially opposite theoretical intersections of outer edges of the outer annular surface 22 and the outer tube surface 11 is 1.3 times to 3 times of a corresponding distance D2 between two radially opposite edges of the machined hole 30.

Figure 5:
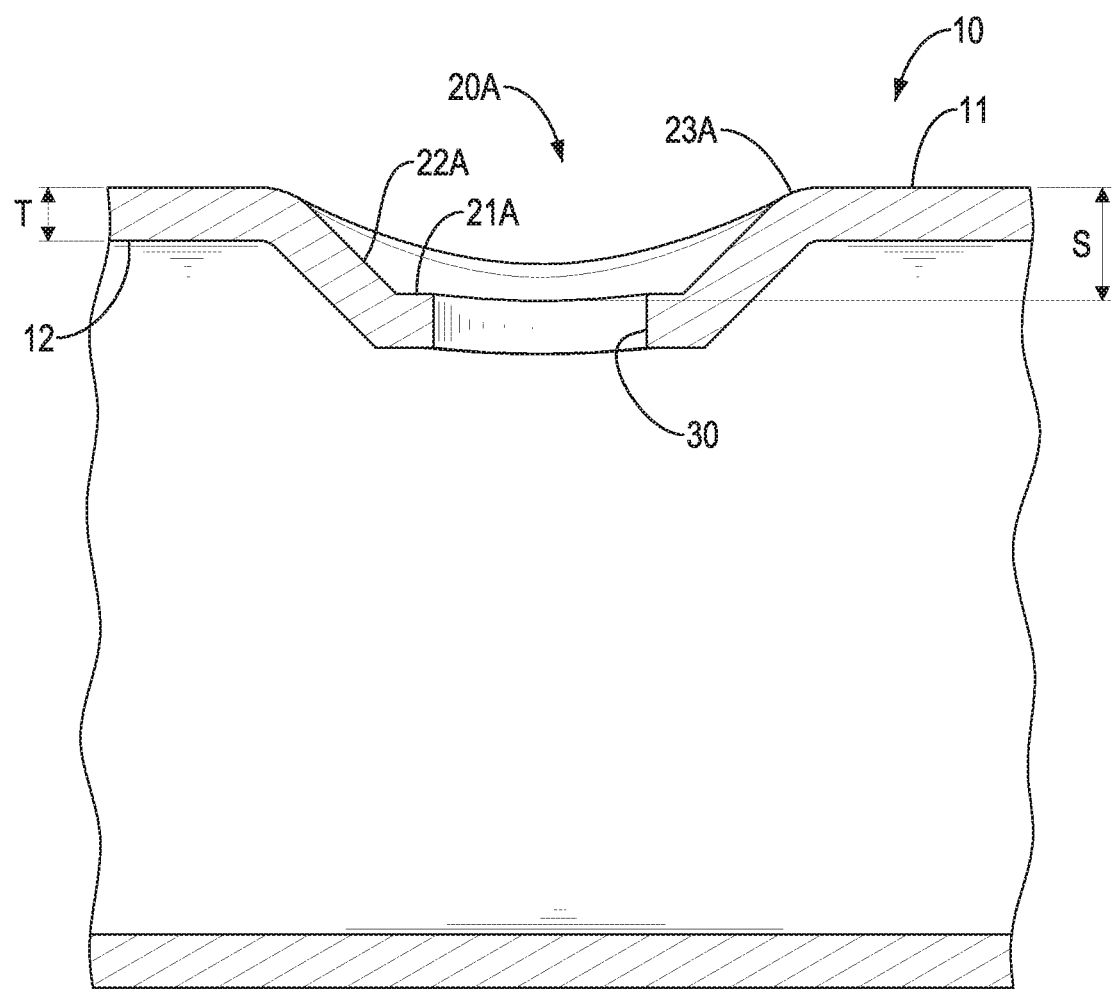
FIG. 5 is a cross sectional side view of another embodiment of a tube for a bicycle with a machined hole in accordance with the present invention.

With reference to FIG. 5, in another embodiment, the outer annular surface 22A of the indented portion 20A and the outer bottom surface 21A intersect to form an angle, not a round corner.

The manufacturing process of the tube for a bicycle in accordance with the present invention is as follows. The body 10, 10A is clamped by a fixture device, and a forming die corresponding to the indented portion 20, 20A is pressed to the body 10 to form the indented portion 20, 20A recessed in the body 10. After that, the body 10 is drilled to form the machined hole 30 by a drilling device. The tube in accordance with the present invention may be applied to a handle assembly of the bicycle. Brake cables and shift cables of the bicycle can be inserted into the inner hole 13 of the body 10 via the machined hole 30. The structural strength of the tube is increased, because the indented portion 20 can distribute stress and prevent stress from getting concentrated around the edge of the machined hole 30. The bicycle with the tube in accordance with the present invention has advantages of good structural strength, light weight, and visual appeal with built-in cables.

Figure 6:
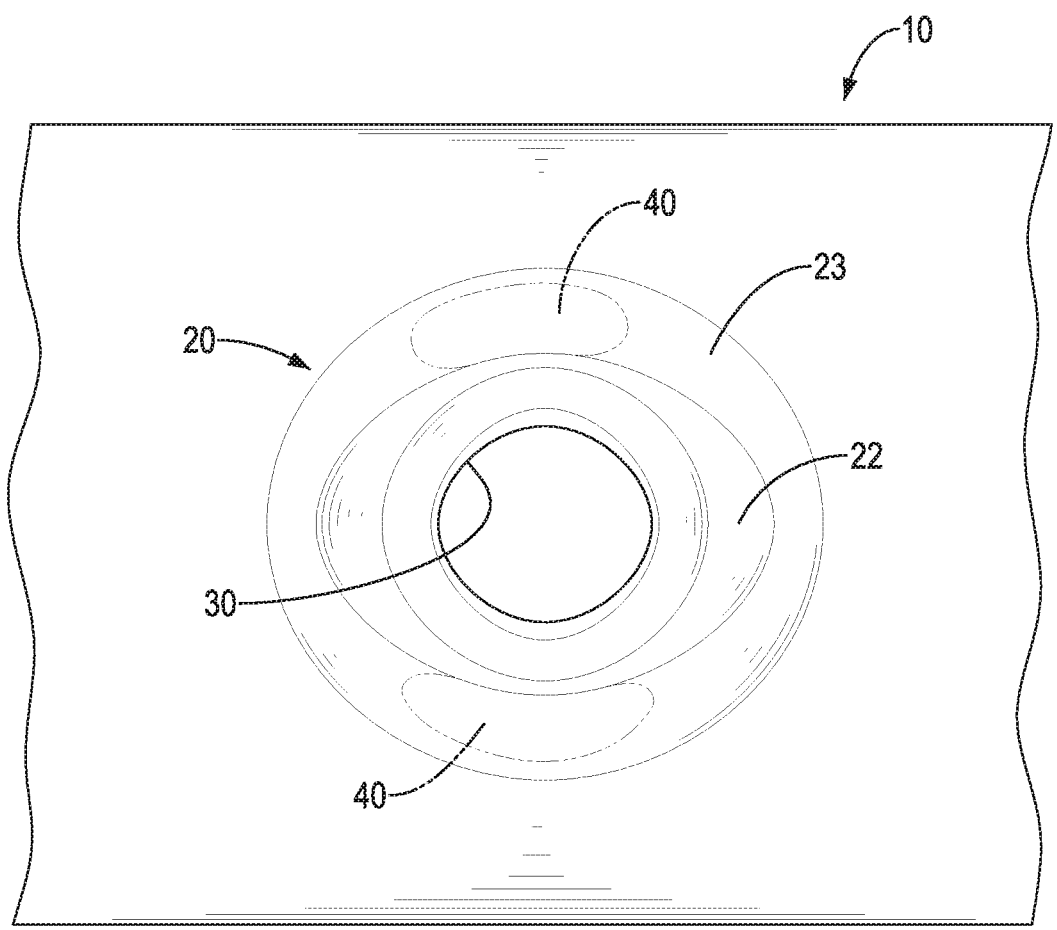
FIG. 6 is an operational top view of the tube in FIG. 1, showing stress concentration regions of the tube.
Figure 7:
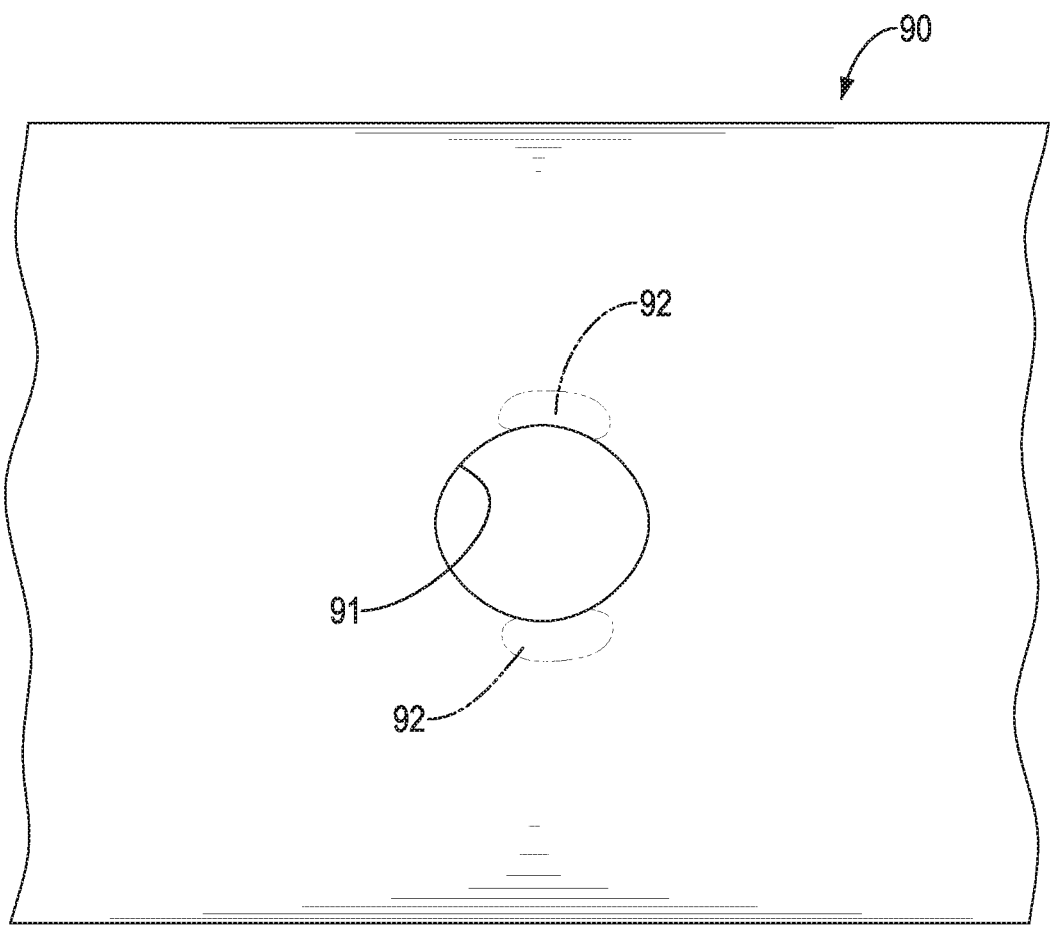
FIG. 7 is an operational top view of a conventional tube of a bicycle with a machined hole, showing stress concentration regions of the tube.

With reference to FIG. 6, when the tube in accordance with the present invention is under external forces such as bending and/or torsional load, stress will concentrate at regions 40 of the indented portion 20, and will concentrate at the first round corner 23 instead of the edge of the machined hole 30. The indented portion 20 formed around the machined hole 30 can distribute stress form the edge of the machined hole 30 to prevent the cracks occurring from the edge of the machined hole 30. The tube in accordance with the present invention has a simplified structure and can be easily manufactured. The structural strength of the tube is increased under a same total weight, and the useful time of the tube can be prolonged.

What is claimed is:

1. A tube for a bicycle, the tube comprising:
   a body made of a material selected from one of a metallic material and a composition material and having
   an outer tube surface;
   an inner tube surface;
   an inner hole longitudinally formed through the body; and
   a tube thickness defined between the outer tube surface and the inner tube surface;
   an indented portion radially recessed in the body from the outer tube surface toward the inner tube surface of the body and having
   a thickness being equal to the tube thickness of the body;
   an outer bottom surface;
   an outer annular surface formed around the outer bottom surface to form an opening gradually larger outward from the outer bottom surface of the indented portion;
   a first round corner being a curved surface smoothly connecting the outer tube surface of the body and the outer annular surface of the indented portion; and
   an angle formed between a tangent line, which is tangent to the outer annular surface, and a tangent plane, which is tangent to the outer tube surface of the body, being less than 90 degrees and greater than or equal to 15 degrees; and
   a machined hole formed through the outer bottom surface of the indented portion and communicating with the inner hole of the body and having an area being smaller than an area of the outer bottom surface of the indented portion,
   wherein the indented portion has a recessed depth in the body, the recessed depth ranging from 1 time to 3 times of the tube thickness, and
   a distance between two radially opposite theoretical intersections of outer edges of the outer annular surface and the outer tube surface is 1.3 times to 3 times of a distance between two radially opposite edges of the machined hole.

2. The tube for a bicycle as claimed in claim 1, wherein the first round corner is rounded with a radius of a maximum of 5 times of the tube thickness and a minimum of 1 time of the tube thickness.

3. The tube for a bicycle as claimed in claim 1, wherein the first round corner has a continuous curvature having a dimension equivalent to a radius of a maximum of 5 times of the tube thickness and a minimum of 1 time of the tube thickness.

4. The tube for a bicycle as claimed in claim 1, wherein the angle of the indented portion is less than or equal to 75 degrees and greater than or equal to 30 degrees.

5. The tube for a bicycle as claimed in claim 2, wherein the angle of the indented portion is less than or equal to 75 degrees and greater than or equal to 30 degrees.

6. The tube for a bicycle as claimed in claim 3, wherein the angle of the indented portion is less than or equal to 75 degrees and greater than or equal to 30 degrees.

7. The tube for a bicycle as claimed in claim 4, wherein an angle is formed between the outer bottom surface of the indented portion and the outer annular surface.

8. The tube for a bicycle as claimed in claim 5, wherein an angle is formed between the outer bottom surface of the indented portion and the outer annular surface.

9. The tube for a bicycle as claimed in claim 6, wherein an angle is formed between the outer bottom surface of the indented portion and the outer annular surface.

10. The tube for a bicycle as claimed in claim 4, wherein a second round corner is formed between the outer bottom surface of the indented portion and the outer annular surface, is a curved surface smoothly connecting the outer annular surface and the outer bottom surface, and is rounded with a radius of a maximum of 5 times of the tube thickness.

11. The tube for a bicycle as claimed in claim 5, wherein a second round corner is formed between the outer bottom surface of the indented portion and the outer annular surface, is a curved surface smoothly connecting the outer annular surface and the outer bottom surface, and is rounded with a radius of a maximum of 5 times of the tube thickness.

12. The tube for a bicycle as claimed in claim 6, wherein a second round corner is formed between the outer bottom surface of the indented portion and the outer annular surface, is a curved surface smoothly connecting the outer annular surface and the outer bottom surface, and is rounded with a radius of a maximum of 5 times of the tube thickness.

13. The tube for a bicycle as claimed in claim 4, wherein a second round corner is formed between the outer bottom surface of the indented portion and the outer annular surface, is a curved surface smoothly connecting the outer annular surface and the outer bottom surface, and has a continuous curvature having a dimension equivalent to a radius of a maximum of 5 times of the tube thickness.

14. The tube for a bicycle as claimed in claim 5, wherein a second round corner is formed between the outer bottom surface of the indented portion and the outer annular surface, is a curved surface smoothly connecting the outer annular surface and the outer bottom surface, and has a continuous curvature having a dimension equivalent to a radius of a maximum of 5 times of the tube thickness.

15. The tube for a bicycle as claimed in claim 6, wherein a second round corner is formed between the outer bottom surface of the indented portion and the outer annular surface, is a curved surface smoothly connecting the outer annular surface and the outer bottom surface, and has a continuous curvature having a dimension equivalent to a radius of a maximum of 5 times of the tube thickness.

16. The tube for a bicycle as claimed in claim 4, wherein the material of the body is selected from one of an aluminum alloy and a carbon fiber.

17. The tube for a bicycle as claimed in claim 5, wherein the material of the body is selected from one of an aluminum alloy and a carbon fiber.

18. The tube for a bicycle as claimed in claim 6, wherein the material of the body is selected from one of an aluminum alloy and a carbon fiber.

19. The tube for a bicycle as claimed in claim 14, wherein the material of the body is selected from one of an aluminum alloy and a carbon fiber.

* * * * *